(12) United States Patent
Bunk et al.

(10) Patent No.: US 8,271,033 B2
(45) Date of Patent: Sep. 18, 2012

(54) DEDICATED ACCESSORY DEVICES FOR HANDHELD COMMUNICATION DEVICES AND RELATED METHODS

(75) Inventors: Johan Richard Bunk, Veberöd (SE); Carl-Johan Tobias Folkesson, Lomma (SE)

(73) Assignee: Sony Ericsson Mobile Communications AB, Lund (SE)

( * ) Notice: Subject to any disclaimer, the term of this patent is extended or adjusted under 35 U.S.C. 154(b) by 237 days.

(21) Appl. No.: 12/724,014

(22) Filed: Mar. 15, 2010

(65) Prior Publication Data

US 2011/0223968 A1 Sep. 15, 2011

(51) Int. Cl.
*H04M 1/00* (2006.01)

(52) U.S. Cl. .............. 455/556.1; 455/41.1; 455/41.3; 455/414.2; 455/502; 709/248

(58) Field of Classification Search .......... 455/556.1, 455/41.2, 414.2, 419, 41.3, 550.1, 466, 557, 455/88, 418, 74.1, 414.1; 709/248, 203, 709/228; 386/E05.003; 340/407.2, 825.22, 340/505, 514, 507, 932.2; 717/178, 173, 717/101; 713/158; 128/204.23, 204.21
See application file for complete search history.

(56) References Cited

U.S. PATENT DOCUMENTS

| | | | |
|---|---|---|---|
| 6,366,215 B1* | 4/2002 | Tice et al. | 340/539.1 |
| 2004/0158829 A1* | 8/2004 | Beresin et al. | 717/178 |
| 2004/0192274 A1* | 9/2004 | Vuori | 455/418 |
| 2005/0202385 A1* | 9/2005 | Coward et al. | 434/307 R |
| 2007/0141985 A1* | 6/2007 | Parkkinen et al. | 455/41.2 |
| 2008/0167806 A1* | 7/2008 | Wheeler et al. | 701/208 |
| 2008/0188209 A1* | 8/2008 | Dorogusker et al. | 455/414.2 |
| 2009/0023395 A1* | 1/2009 | Chang et al. | 455/74.1 |
| 2009/0086278 A1* | 4/2009 | Vendrow et al. | 358/402 |
| 2009/0111533 A1* | 4/2009 | Johansson et al. | 455/575.1 |
| 2010/0234051 A1* | 9/2010 | Holden et al. | 455/466 |
| 2010/0280904 A1* | 11/2010 | Ahuja | 705/14.58 |
| 2011/0003550 A1* | 1/2011 | Klinghult et al. | 455/41.3 |
| 2011/0028128 A1* | 2/2011 | Cazanas et al. | 455/414.1 |
| 2011/0055407 A1* | 3/2011 | Lydon et al. | 709/228 |
| 2011/0126005 A1* | 5/2011 | Carpenter et al. | 713/158 |
| 2011/0197887 A1* | 8/2011 | Truschel et al. | 128/204.23 |

FOREIGN PATENT DOCUMENTS

| | | |
|---|---|---|
| EP | 1 168 784 A2 | 2/2002 |
| EP | 1 347 623 A1 | 9/2003 |
| WO | WO 02/053245 A1 | 11/2001 |

OTHER PUBLICATIONS

The International Search Report and the Written Opinion for PCT/IB2011/000322 mailed Jun. 8, 2011.

* cited by examiner

*Primary Examiner* — Tan Trinh
(74) *Attorney, Agent, or Firm* — Myers Bigel Sibley & Sajovec (57) ABSTRACT

An accessory device and a handheld device may be synchronized by forming a communication link between the handheld device and the accessory device. The handheld device includes a plurality of functions and the accessory device is configured to operate a subset of the plurality of functions. Each of the plurality of functions of the handheld device includes executable program code, content data files and functional setting information. The executable program code, content data files and functional setting information is transferred for at least one of the plurality of functions of the handheld device to the accessory device. The communication link between the handheld device and the accessory device is disconnected. The subset of the plurality of functions is operated on the accessory device using the transferred executable program code, content data files and functional setting information from the handheld device after disconnecting the communication link between the handheld device and the accessory device.

18 Claims, 4 Drawing Sheets

DEDICATED ACCESSORY DEVICES FOR HANDHELD COMMUNICATION DEVICES AND RELATED METHODS

FIELD OF THE INVENTION

The present invention relates to multifunctional handheld devices, and more particularly, to accessories for multifunctional handheld devices.

BACKGROUND

Handheld communication devices typically include various functionalities integrated into a single unit. A single handheld device may provide Internet access, web-browsing, video and/or music playing, text display and other functions in addition to cellular communications. The designs of such handheld communications devices may not be optimized for any single function, but rather the designs are typically compromised to provide all of the functions in one device. For example, the keypad may be sized to allow text entry and/or phone number entry; however, the keypad may not be utilized for video viewing. However, a device designed to be used exclusively for video viewing may include a larger screen size than a multipurpose device and a reduced keypad size or no keypad at all. Accordingly, a multipurpose handheld device typically compromises its design so that the device may be used for different functions.

Therefore, the optimization of some design features for certain functions is typically sacrificed to allow for the operations of all of the functions on a single device.

SUMMARY OF EMBODIMENTS OF THE INVENTION

According to some embodiments of the invention, methods for synchronizing an accessory device and a handheld device include forming a communication link between the handheld device and the accessory device. The handheld device includes a plurality of functions and the accessory device is configured to operate a subset of the plurality of functions. Each of the plurality of functions of the handheld device includes executable program code, content data files and functional setting information. The executable program code, content data files and functional setting information is transferred for at least one of the plurality of functions of the handheld device to the accessory device. The communication link between the handheld device and the accessory device is disconnected. The subset of the plurality of functions is operated on the accessory device using the transferred executable program code, content data files and functional setting information from the handheld device after disconnecting the communication link between the handheld device and the accessory device.

In some embodiments, the handheld device includes a cellular communications device comprising a cellular transceiver and the accessory device is devoid of a cellular transceiver.

In some embodiments, the accessory device comprises headphones and the transferred executable program code includes executable program code configured to play music, the transferred content data files include audio files, and the functional setting information includes audio settings for operating the executable program code and/or playing the audio files.

In some embodiments, the accessory device comprises an electronic book device configured to display text, the transferred executable program code includes executable program code configured to display text on the electronic book device, the transferred content data files include text files, and the functional setting information includes text setting for operating the executable program code and/or displaying the text files.

In some embodiments, the accessory device comprises a calendar device configured to display and/or manipulate time, date and/or calendar information, the transferred executable program code includes executable program code configured to display and/or manipulate the time, date and/or calendar information, the transferred content data files includes time, date and/or calendar information and the functional setting information includes operational settings for operating the executable program code and/or displaying and/or manipulating the time, date and/or calendar information.

In some embodiments, the accessory device comprises a video player configured to display video and/or play audio content, the transferred executable program code includes executable program code configured to display video and/or play audio content, the transferred content data files include video and/or audio files, and the functional setting information includes video and/or audio operational settings for operating the executable program code for displaying video files and/or playing audio files.

According to some embodiments of the present invention, a handheld communications device is configured for synchronizing an accessory device. The device includes a dedicated function downloading module configured to form a communication link between the handheld device and the accessory device. The device includes plurality of functions, each of the plurality of functions including executable program code, content data files and functional setting information. The accessory device is configured to operate a subset of the plurality of functions. The dedicated function downloading module is further configured to transfer the executable program code, content data files and functional setting information for at least one of the plurality of functions of the handheld device to the accessory device and to disconnect the communication link between the handheld device and the accessory device. The accessory device is configured to operate the subset of the plurality of functions on the accessory device using the transferred executable program code, content data files and functional setting information from the handheld device after the communication link between the handheld device and the accessory device is disconnected.

In some embodiments, the handheld device comprises a cellular communications device comprising a cellular transceiver and is configured to transfer the executable program code, content data files and functional setting information to the accessory device, which is devoid of a cellular transceiver.

In some embodiments, the accessory device receives user input modifies the executable program code, the content data files and/or the functional setting information and/or transfers modified executable program code, the content data files and/or the functional setting information to the handheld device after receiving the user input that modifies the executable program code, the content data files and/or the functional setting information.

According to some embodiments of the present invention, an accessory device for synchronizing with a handheld device is provided. The handheld device comprises a plurality of functions, and each of the plurality of functions of the handheld device includes executable program code, content data files and functional setting information. The accessory device includes a dedicated function downloading module configured to receive the executable program code, content data files and functional setting information for at least one of the plurality of functions of the handheld device via a communication link with the handheld device. The dedicated function downloading module is further configured to disconnect the communication link between the handheld device and the accessory device, and a dedicated function operating module is configured to operate the subset of the plurality of functions on the accessory device using the executable program code, content data files and functional setting information from the handheld device after disconnecting the communication link between the handheld device and the accessory device.

According to some embodiments, the handheld device is a cellular communications device comprising a cellular transceiver and the accessory device is devoid of a cellular transceiver.

In some embodiments, the accessory device comprises headphones, and the transferred executable program code includes executable program code configured to play music, the transferred content data files includes audio files, and the functional setting information includes audio settings for operating the executable program code and/or playing the audio files.

In some embodiments, the accessory device comprises an electronic book device configured to display text, the transferred executable program code includes executable program code configured to display text on the electronic book device, the transferred content data files include text files, and the functional setting information includes text setting for operating the executable program code and/or displaying the text files.

In some embodiments, the accessory device comprises a calendar device configured to display and/or manipulate time, date and/or calendar information, the transferred executable program code includes executable program code configured to display and/or manipulate the time, date and/or calendar information, the transferred content data files includes time, date and/or calendar information and the functional setting information includes operational settings for operating the executable program code and/or displaying and/or manipulating the time, date and/or calendar information.

In some embodiments, the accessory device comprises a video player configured to display video and/or play audio content, the transferred executable program code includes executable program code configured to display video and/or play audio content, the transferred content data files include video and/or audio files, and the functional setting information includes video and/or audio operational settings for operating the executable program code for displaying video files and/or playing audio files.

In some embodiments, the dedicated function operating module is configured to receive user input from the accessory device that modifies the executable program code, the content data files and/or the functional setting information. In some embodiments, the dedicated function downloading module is configured to transfer modified executable program code, the content data files and/or the functional setting information to the handheld device after receiving the user input that modifies the executable program code, the content data files and/or the functional setting information.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION OF EMBODIMENTS OF THE INVENTION

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present invention. The sequence of operations (or steps) is not limited to the order presented in the claims or figures unless specifically indicated otherwise.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, embodiments of the present invention may take the form of a computer program product on a computer-usable or computer-readable storage medium having computer-usable or computer-readable program code embodied in the medium for use by or in connection with an instruction execution system.

Figure 1:
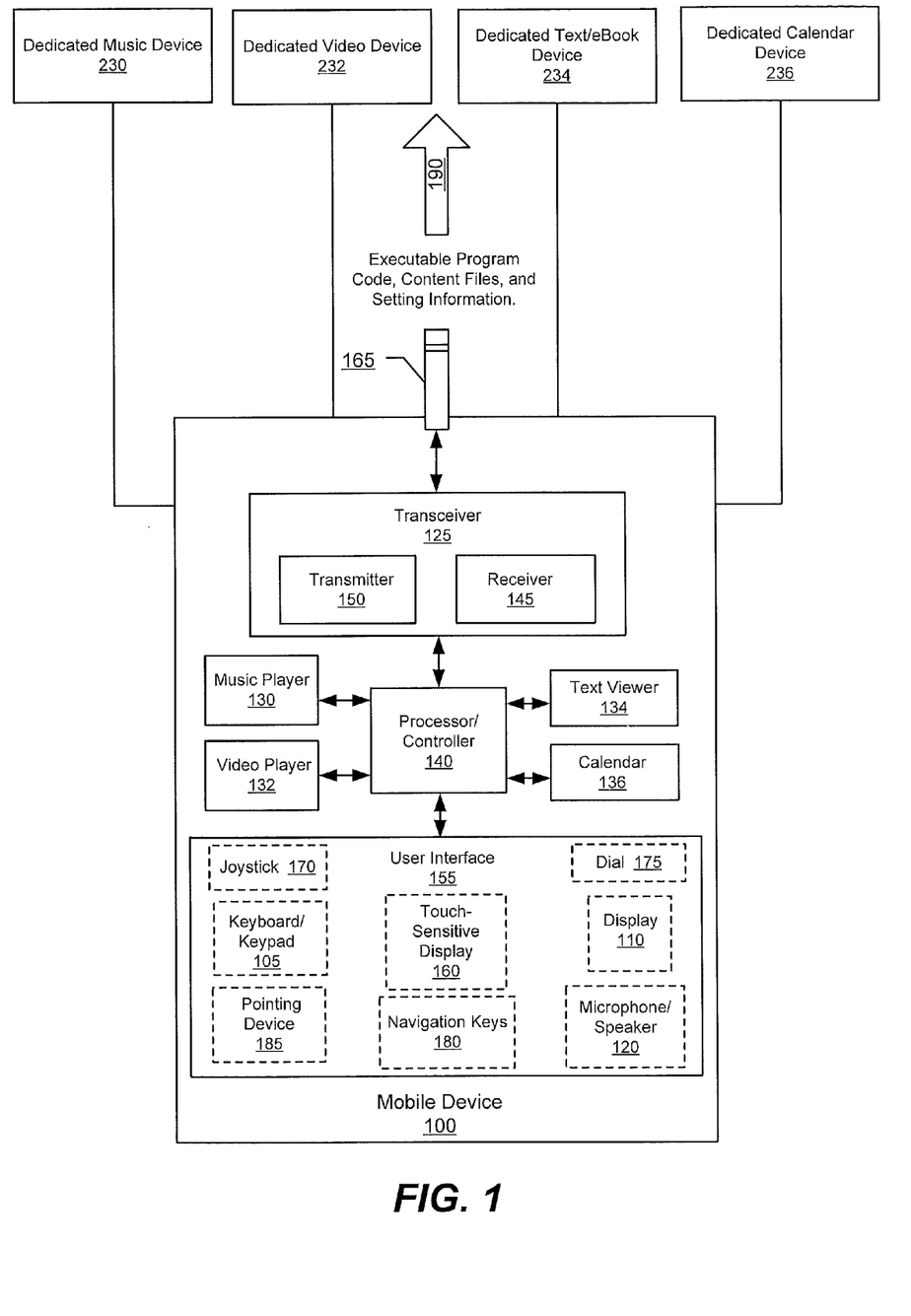
FIG. 1 is a schematic diagram of a handheld device and dedicated accessory devices according to some embodiments of the present invention.

FIG. 1 is a block diagram illustrating a mobile terminal 100 and a plurality of dedicated accessory devices, including a dedicated music device 230, a dedicated video device 232, a dedicated text or eBook device 234 and/or a dedicated organizer or calendar device 236 in accordance with some embodiments of the present invention. As shown in FIG. 1, the mobile terminal 100 includes a transceiver 125, a controller or processor 140 and a user interface 155. The processor 140 is configured to operate a plurality of functions or applications. As illustrated in FIG. 1, the applications of the mobile terminal 100 include a music player 130, a video player 132, a text viewer 134 and an organizer or calendar 136. It should be understood that the mobile terminal may be configured to provide one or more of the applications shown, or additional applications, such as computer games, may be provided. In some embodiments, each of the functions or applications on the mobile terminal 100 corresponds to a separate dedicated accessory device. For example, as illustrated in FIG. 1, the music player 130 generally corresponds to functions provided by the dedicated music device 230, the video player 132 generally corresponds to functions provided by the dedicated video device 232, the text viewer 134 generally corresponds to functions provided by the dedicated text device 234, and the calendar 136 generally corresponds to functions provided by the dedicated calendar device 236.

As illustrated in FIG. 1, the executable program code, content files, and/or functional setting information for the music player 130, video player 132, text viewer 134 and organizer or calendar 136 on the mobile terminal 100 may be transferred to the dedicated music device 230, dedicated video device 232, dedicated text or eBook device 234 and dedicated organizer or calendar device 236, respectively, as indicated by arrow 190. The mobile terminal 100 may be a multipurpose or multifunctional device in which many different applications, e.g., music, video, text, calendars, etc., may be used. Therefore, the mobile terminal 100 may be sized and configured to provide various functions; however, the configuration of the mobile terminal 100 is typically not optimized for any specific function or application. For example, the screen size may be reduced for video viewing to permit additional space for a keypad for text entry and to maintain a handheld size. However, the dedicated devices 230, 232, 234, and 236 may be optimized or configured for specific functions in a manner that may be difficult in a multipurpose device. For example, the dedicated video device 232 may include a relatively large video screen and a minimal keypad that would not be well suited for extensive entering of text.

Accordingly, a communication link may be formed between the terminal 100 and the dedicated accessory devices 230, 232, 234, and 236 to transfer the executable program code, content data files and functional setting information for at least one of the respective applications 130, 132, 134, and 136. The communication link may be disconnected, and one or more of the applications 130, 132, 134, and 136 may be operated on a respective one of the dedicated accessory devices 230, 232, 234, and 236 using the transferred executable program code, content data files and functional setting information. In some embodiments, the dedicated accessory devices 230, 232, 234, and 236 are devoid of a cellular transceiver such that the dedicated accessory devices 230, 232, 234, and 236 may be transported and/or used in areas where use of cellular devices is not permitted, such as airplanes. Moreover, the dedicated accessory devices 230, 232, 234, and 236 may be configured to operate only a subset of the plurality of functions of the terminal 100 and may be devoid of other operational capabilities for some of the other functions or applications of the terminal 100.

In some embodiments, the accessory devices 230, 232, 234, and 236 may be configured to transfer executable program code, content data files and/or functional setting information to the terminal 100. Thus, the user may modify the executable program code, content data files and/or functional settings on one of the accessory devices 230, 232, 234, and 236, e.g., by adding or deleting content or changing functional settings, and the modified information may be communicated back to the terminal 100. The user may use either the terminal 100 or accessory devices 230, 232, 234, and 236 and synchronize the executable program code, content data files and/or functional settings. The data transfer may be automatic or may be initiated by a user. Accordingly, data transfers may occur from the accessory devices 230, 232, 234, and 236 to the terminal 100 or from the terminal 100 to the accessory devices 230, 232, 234, and 236. In addition, one or more of the accessory devices 230, 232, 234, and 236 may be configured to transfer executable program code, content data files and/or functional settings for various applications to other ones of the accessory devices 230, 232, 234, and 236.

The transceiver 125 typically includes a transmitter circuit 150 and a receiver circuit 145 which cooperate to transmit and receive radio frequency signals, e.g., to and from base station transceivers via an antenna 165. The transceiver 125 may also be configured to transmit and receive signals to and from the dedicated accessory devices 230, 232, 234 and 236, for example, using short distance communication protocols such as BlueTooth® or infrared communications. For example, as shown in FIG. 1, the processor 140 may be configured to communicate over the transceiver 125 using one or more communication protocols including cellular communication protocols, which may include, but are not limited to, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS). Other communication protocols may include, but are not limited to, Bluetooth®, RFID and/or WLAN (e.g., 802.11a, 802.11b, 802.11e, 802.11g, 802.11i and/or 802.11n). Accordingly, the mobile terminal 100 may be configured to support cellular communication protocols as well as short distance communication protocols, such as Bluetooth®, RFID and/or WLAN. Moreover, although the communication links between the mobile device 100 and the dedicated accessory devices 230, 232, 234 and 236 are illustrated in FIG. 1 as wireless communication links, it should be understood that data may be transferred between the mobile device 100 and the dedicated accessory devices 230, 232, 234 and 236 using any suitable communication link, including a wired connection.

The music player 130, video player 132, text viewer 134 and organizer or calendar 136 may be provided and stored in a memory, which may represent a hierarchy of memory that may include volatile and/or non-volatile memory, such as removable flash, magnetic, and/or optical rewritable non-volatile memory. The processor 140 is coupled to the transceiver 125, the music player 130, video player 132, text viewer 134, organizer or calendar 136 and the user interface 155. The processor 140 may be, for example, a commercially available or custom microprocessor that is configured to coordinate and manage operations of the transceiver 125, the music player 130, the video player 132, the text viewer 134, the calendar 136 and/or the user interface 155.

As noted above, the mobile terminal 100 may further include a user interface 155 coupled to the processor 140. The user interface 155 may include a keyboard/keypad 105, a display 110 (such as a liquid crystal display), a microphone 120, a touch sensitive display 160, a joystick 170, a dial 175, a directional key(s) 180, and/or a pointing device 185 (such as a mouse, trackball, touch pad, etc.). For example, the keyboard/keypad 105 may be operable to define alphanumeric characters/symbols on the display 110. However, depending on functionalities offered by the mobile terminal 100, additional and/or fewer elements of the user interface 155 may actually be provided. For instance, the touch sensitive display 160 may functionally replace a display 110, a keypad 105, and/or a pointing device 185. The touch sensitive display 160 may display a plurality of virtual command and/or control buttons. The command/control buttons may be selected by touching a stylus on the touch sensitive display 160 at the appropriate location(s) of the virtual buttons shown on the touch sensitive display 160, for example, to select and/or launch an application via a displayed menu screen. The foregoing components of the mobile terminal 100 may be included in many conventional mobile terminals and their functionality is generally known to those skilled in the art.

Figure 2:
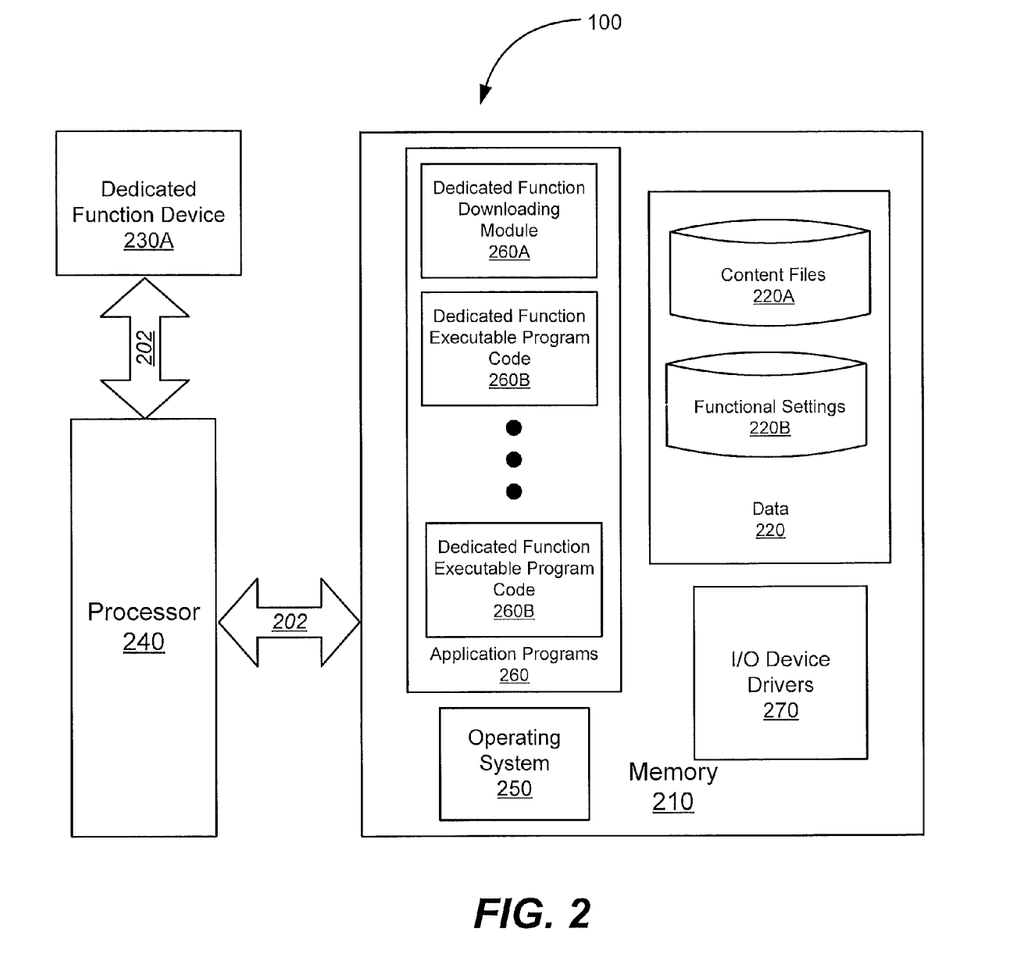
FIG. 2 is a schematic diagram of a software/hardware architecture for the handheld device from FIG. 1 according to some embodiments of the present invention.

FIG. 2 illustrates a hardware/software architecture of the mobile terminal 100 of FIG. 1, including a memory 210 and a processor 240 that may be used to provide operations and data transfers with a dedicated function device 230A according to some embodiments of the present invention. In some embodiments, the processor 240 may correspond to the processor 140 of the mobile terminal 100 of FIG. 1, and the dedicated function device 230A may be one (or more) of the dedicated function devices 230, 232, 235 and 236 of FIG. 1.

As illustrated in FIG. 2, the processor 240 is configured to communicate with the memory 210 and the dedicated function device 230A via a data bus 202. The memory 210 may be configured to store several categories of software, such as an operating system 250, applications programs 260, and input/output (I/O) device drivers 270. The operating system 250 controls the management and/or operation of system resources and may coordinate execution of programs by the processor 240. The I/O device drivers 270 typically include software routines accessed through the operating system 250 by the application programs 260 to communicate with input/output devices, such as those included in the user interface 155 of FIG. 1, and/or other components of the memory 210.

The application programs 260 are illustrative of programs that implement various features according to embodiments of the present invention, and may include the dedicated function executable program codes and at least one application which supports operations for downloading or transferring dedicated functions as described herein. For example, the applications programs 260 may include a dedicated function downloading module 260A for transferring data and/or a plurality of dedicated function executable program code modules 260B. The dedicated function executable program code modules 260B may include executable program code for the music player 130, video player 132, the text viewer 134, the and/or calendar 136 of FIG. 1 and/or other functions of a handheld device, such as camera or gaming programs.

The memory 210 further includes data 220 for the application programs 260 including one or more database(s), such as content files 220A and functional settings 220B corresponding to the dedicated function executable program code 260B. For example, if the dedicated function executable program code 260B is a music player, the content files 220A may include music content files and the functional settings 220B may include volume controls, favorite songs, etc. related to the music player. The data 220 may include any data that may be stored in the memory 210 and accessed by the application programs 260.

Figure 3:
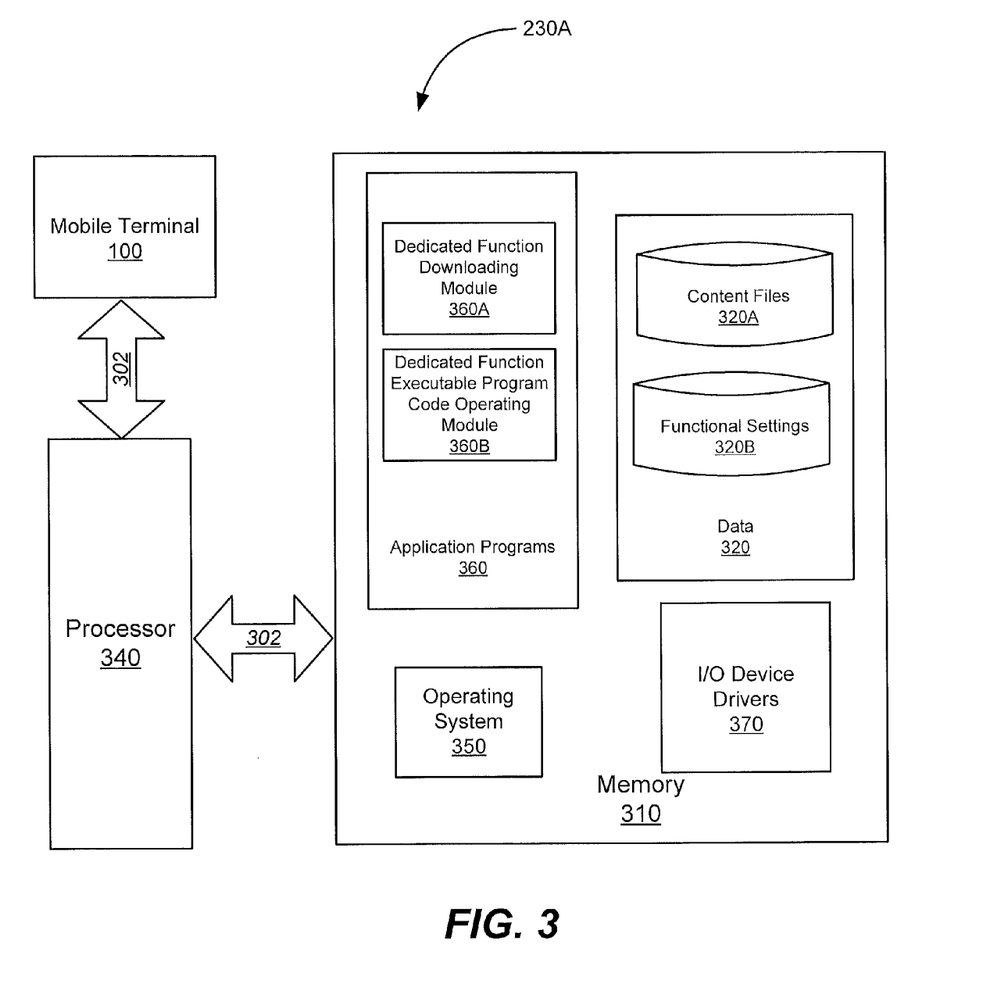
FIG. 3 is a schematic diagram of a software/hardware architecture for one of the dedicated accessory devices from FIG. 1 according to some embodiments of the present invention.

FIG. 3 illustrates a hardware/software architecture of a dedicated function device 230A of FIG. 1, including a memory 310 and a processor 340 that may be used to provide operations and data transfers with the mobile terminal 100 according to some embodiments of the present invention. In some embodiments, the dedicated function device 230A may be one of the dedicated function devices 230, 232, 235 and 236 of FIG. 1; however, the dedicated accessory functional device 230A may be configured to provide any one or more of the plurality of functions provided on the mobile terminal 100, including camera or gaming functions.

As illustrated in FIG. 3, the processor 340 is configured to communicate with the memory 310 and the mobile terminal 100 via a data bus 302. The memory 310 may be configured to store several categories of software, such as an operating system 350, applications programs 360, and input/output (I/O) device drivers 370. The operating system 350 controls the management and/or operation of system resources and may coordinate execution of programs by the processor 340.

The application programs 360 may include the dedicated function executable program codes and at least one application which supports operations for downloading or transferring dedicated functions as described herein. For example, the applications programs 360 may include a dedicated function downloading module 360A and/or a dedicated function executable program code operating module 360B that is configured to operate executable program code for one of the dedicated functions. The dedicated function executable program code operating modules 360B may include executable program code for at least one of the music player 130, video player 132, the text viewer 134, and/or the calendar 136 of FIG. 1 and/or other functions that may be provided on the mobile terminal 100 and transferred to the dedicated accessory device 230A. The memory 310 further includes data 320 for the application programs 360 including one or more database(s), such as content files 320A and functional settings 320B corresponding to the dedicated function executable program code module 360B.

Accordingly, the dedicated function downloading module 260A of the handheld terminal 100 and the dedicated function downloading module 360A of the dedicated accessory device 230A may be configured for downloading one of the dedicated function executable program codes 260B, and corresponding content files 220A and functional settings 220B from the terminal 100 to the dedicated accessory device 230A and/or from the dedicated accessory device 230A to the terminal 100. After the communications between the terminal 100 and the accessory device 230A are disconnected, the dedicated accessory device 230A may independently execute the dedicated function executable program codes using the dedicated function executable program code operating module 360B without requiring any ongoing communication link with the terminal 100. As illustrated, the application programs 360 of the accessory device 230A are a reduced subset of the dedicated function executable program codes 260B of the terminal 100. In some embodiments, the dedicated accessory device 230A lacks the functional capability to operate all of the dedicated function executable program codes 260B of the terminal 100.

Figure 4:
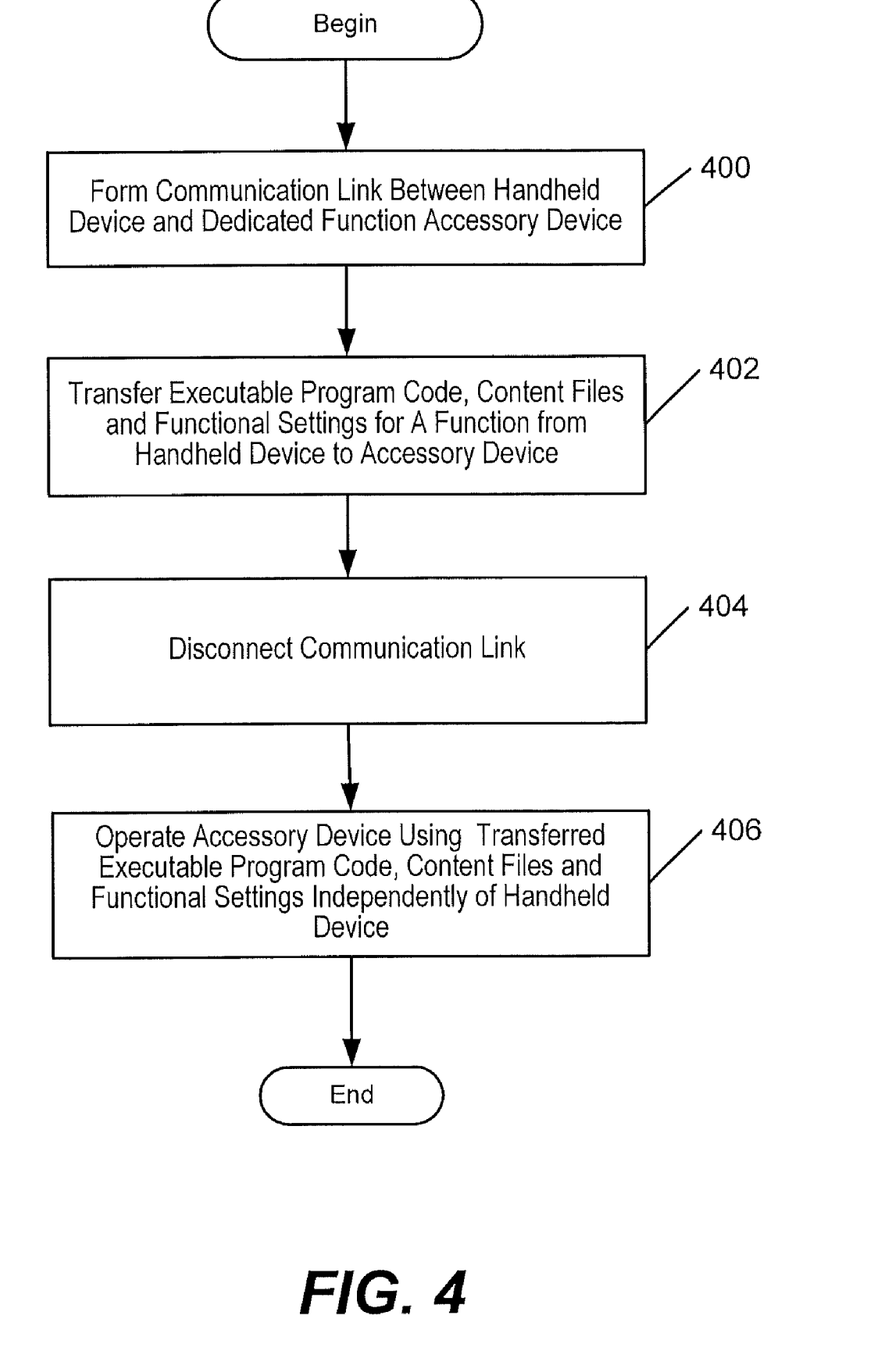
FIG. 4 is a flowchart illustrating operations according to some embodiments of the present invention.

Operations according to some embodiments of the present invention are illustrated in FIG. 4. A communication link may be formed between a handheld device and an accessory device (Block 400). The handheld device includes a plurality of functions and the accessory device is configured to operate a subset of the plurality of functions. Each of the plurality of functions of the handheld device includes executable program code, content data files and functional setting information. The executable program code, content data files and functional setting information is transferred for at least one of the plurality of functions of the handheld device to the accessory device (Block 402). The communication link between the handheld device and the accessory device is disconnected (Block 404). The subset of the plurality of functions is operated on the accessory device using the transferred executable program code, content data files and functional setting information from the handheld device after disconnecting the communication link between the handheld device and the accessory device (Block 406).

Although embodiments according to the present invention are described herein with respect to a handheld device and a dedicated function accessory device, it should be understood that the operations described with respect to the handheld device may be performed by the dedicated accessory device and/or the operations described with respect to the accessory device may be performed by the handheld device. The devices or "capsules" may be configured to utilize a set of executable program code, content data files and/or functional setting files for one or more applications. In some embodiments, the device capsules may be capable of carrying another set of executable program code, content data files and/or functional setting files for additional applications that the device capsule is configured to store in memory and/or transfer to another device as a carrier device without necessarily having the capability of operating the executable program code, content data files and/or functional setting files.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method for synchronizing an accessory device and a handheld device, the method comprising:

forming a communication link between the handheld device and the accessory device, the handheld device comprising a plurality of functions and the accessory device being configured to operate a subset of the plurality of functions, wherein each of the plurality of functions of the handheld device includes executable program code, content data files and functional setting information that corresponds to the executable program code;

transferring the executable program code, content data files and functional setting information for at least one of the plurality of functions of the handheld device to the accessory device;

disconnecting the communication link between the handheld device and the accessory device; and operating the subset of the plurality of functions on the accessory device using the transferred executable program code, content data files and functional setting information that corresponds to the executable program code from the handheld device after disconnecting the communication link between the handheld device and the accessory device.

2. The method of claim 1, wherein the handheld device comprises a cellular communications device comprising a cellular transceiver and the accessory device is devoid of a cellular transceiver.

3. The method of claim 1, wherein the accessory device comprises headphones and the transferred executable program code include executable program code configured to play music, the transferred content data files include audio files, and the functional setting information includes audio volume settings for operating the executable program code and/or playing the audio files.

4. The method of claim 1, wherein the accessory device comprises an electronic book device configured to display text, the transferred executable program code includes executable program code configured to display text on the electronic book device, the transferred content data files include text files, and the functional setting information includes text setting for operating the executable program code and/or displaying the text files.

5. The method of claim 1, wherein the accessory device comprises a calendar device configured to display and/or manipulate time, date and/or calendar information, the transferred executable program code includes executable program code configured to display and/or manipulate the time, date and/or calendar information, the transferred content data files includes time, date and/or calendar information and the functional setting information includes operational settings for operating the executable program code and/or displaying and/or manipulating the time, date and/or calendar information.

6. The method of claim 1, wherein the accessory device comprises a video player configured to display video and/or play audio content, the transferred executable program code includes executable program code configured to display video and/or play audio content, the transferred content data files include video and/or audio files, and the functional setting information includes video and audio volume operational settings for operating the executable program code for displaying video files and/or playing audio files.

7. The method of claim 1, further comprising receiving user input to the accessory device that modifies the executable program code, the content data files and/or the functional setting information.

8. The method of claim 7, further comprising transferring modified executable program code, the content data files and/or the functional setting information to the handheld device after receiving the user input that modifies the executable program code, the content data files and/or the functional setting information.

9. A handheld communications device configured for synchronizing an accessory device, the device comprising:
   a dedicated function downloading module configured to form a communication link between the handheld device and the accessory device; and
   a plurality of functions, each of the plurality of functions including executable program code, content data files and functional setting information that corresponds to the executable program code, wherein the accessory device is configured to operate a subset of the plurality of functions;
   wherein the dedicated function downloading module is further configured to transfer the executable program code, content data files and functional setting information for at least one of the plurality of functions of the handheld device to the accessory device and to disconnect the communication link between the handheld device and the accessory device;
   wherein the accessory device is configured to operate the subset of the plurality of functions on the accessory device using the transferred executable program code, content data files and functional setting information that corresponds to the executable program code from the handheld device after the communication link between the handheld device and the accessory device is disconnected.

10. The device of claim 9, wherein the handheld device comprises a cellular communications device comprising a cellular transceiver and is configured to transfer the executable program code, content data files and functional setting information to the accessory device, which is devoid of a cellular transceiver.

11. An accessory device for synchronizing with a handheld device, wherein the handheld device comprises a plurality of functions, each of the plurality of functions of the handheld device comprising executable program code, content data files and functional setting information that corresponds to the executable program code, the accessory device comprising:
   a dedicated function downloading module configured to receive the executable program code, content data files and functional setting information that corresponds to the executable program code for at least one of the plurality of functions of the handheld device via a communication link with the handheld device, the dedicated function downloading module further configured to disconnect the communication link between the handheld device and the accessory device; and
   a dedicated function operating module configured to operate the subset of the plurality of functions on the accessory device using the executable program code, content data files and functional setting information that corresponds to the executable program code from the handheld device after disconnecting the communication link between the handheld device and the accessory device.

12. The accessory device of claim 11, wherein the handheld device comprises a cellular communications device comprising a cellular transceiver and the accessory device is devoid of a cellular transceiver.

13. The accessory device of claim 11, further comprising headphones, wherein the transferred executable program code includes executable program code configured to play music, the transferred content data files includes audio files, and the functional setting information includes audio volume settings for operating the executable program code and/or playing the audio files.

14. The accessory device of claim 11, wherein the accessory device comprises an electronic book device configured to display text, the transferred executable program code includes executable program code configured to display text on the electronic book device, the transferred content data files include text files, and the functional setting information includes text setting for operating the executable program code and/or displaying the text files.

15. The accessory device of claim 11, wherein the accessory device comprises a calendar device configured to display and/or manipulate time, date and/or calendar information, the transferred executable program code includes executable program code configured to display and/or manipulate the time, date and/or calendar information, the transferred content data files includes time, date and/or calendar information and the functional setting information includes operational settings for operating the executable program code and/or displaying and/or manipulating the time, date and/or calendar information.

16. The accessory device of claim 11, wherein the accessory device comprises a video player configured to display video and/or play audio content, the transferred executable program code includes executable program code configured to display video and/or play audio content, the transferred content data files include video and/or audio files, and the functional setting information includes video and audio volume operational settings for operating the executable program code for displaying video files and/or playing audio files.

17. The accessory device of claim 11, wherein the dedicated function operating module is configured to receive user input from the accessory device that modifies the executable program code, the content data files and/or the functional setting information.

18. The accessory device of claim 11, wherein the dedicated function downloading module is configured to transfer modified executable program code, the content data files and/or the functional setting information to the handheld device after receiving the user input that modifies the executable program code, the content data files and/or the functional setting information.

* * * * *